Figure 1:
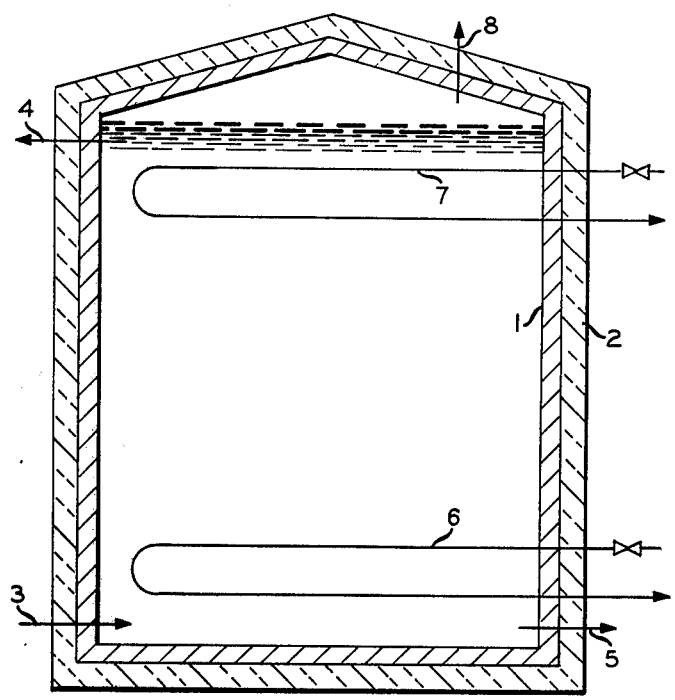

United States Patent [19]

Cheng

[11] 4,048,063

[45] Sept. 13, 1977

[54] INDUCED TEMPERATURE GRADIENT SETTLING VESSEL

[75] Inventor: Paul J. Cheng, Bartlesville, Okla.

[73] Assignee: Phillips Petroleum Company, Bartlesville, Okla.

[21] Appl. No.: 586,324

[22] Filed: June 12, 1975

[51] Int. Cl.² ............................................. B01D 21/00
[52] U.S. Cl. ........................................ 210/72; 210/71; 210/187
[58] Field of Search ............... 210/72, 83, 176, 187, 210/207, 71; 23/1

[56] References Cited

U.S. PATENT DOCUMENTS

| | | | |
|---|---|---|---|
| 1,940,753 | 12/1933 | Howard | 210/72 |
| 2,081,215 | 5/1937 | Boosey | 210/187 |
| 2,358,414 | 9/1944 | Peavey | 210/72 |
| 2,501,436 | 3/1950 | Cleveland et al. | 23/1 |
| 2,737,297 | 3/1956 | Gardner | 210/176 |
| 2,827,172 | 3/1958 | Frazier | 210/72 |
| 2,834,464 | 5/1958 | Fellows et al. | 210/72 |
| 2,862,621 | 12/1958 | Asmus | 210/176 |
| 2,991,886 | 7/1961 | Thomas | 210/176 |
| 3,272,339 | 9/1966 | Olsen | 210/187 X |
| 3,343,678 | 9/1967 | Olsen | 210/187 X |

OTHER PUBLICATIONS

"The Forgotten Effect" article found in Chem. and Eng. News, vol. 34, No. 30, p. 3606, July 23, 1956.

Primary Examiner—Frank W. Lutter
Assistant Examiner—N. Greenblum

[57] ABSTRACT

An apparatus and method are provided for settling small particles of micron and submicron size from a liquid in which the particles are contained. The method of the invention entails introducing the particle containing liquid into an apparatus of this invention. The apparatus is a settling vessel having vertical dimensions sufficient in relation to the overall capacity of the vessel to allow establishing a temperature gradient between the upper and lower portions of liquid contained therein with the vessel sufficiently insulated to minimize changes of the temperature inside the vessel in response to changes in the ambient temperature outside the vessel and also having means for supplying indirect cooling heat exchange within the lower portion of the vessel and indirect heating heat exchange within the upper portion of the vessel to induce a constant temperature gradient within the vessel.

4 Claims, 1 Drawing Figure

INDUCED TEMPERATURE GRADIENT SETTLING VESSEL

BACKGROUND OF THE INVENTION

This invention relates to settling vessels. In one of its aspects this invention relates to the settling of small, i.e., micron and submicron size, particles from a liquid within which the particles are contained. In another of its aspects this invention relates to inducing a temperature gradient within a settling vessel.

Various kinds of liquids, particularly hydrocarbons used as feedstocks in various chemical reactions and processes, often contain small particles of solids within the micron and submicron size range. These particles are particularly difficult to remove from the liquid because of the slow settling time of the particles. The small particles often cause problems in chemical processes, i.e., the feedstock of carbon black processes often contain minute particles of catalyst solids which become ash when the oil is charged into a carbon black reactor with the ash, in turn, causing slagging of the refractory lining of the carbon black reactor. Many other processes can be also injuriously affected by fines contaminants in the final product.

It is therefore an object of this invention to provide an apparatus and method for the removal of fines particles from a liquid in which the particles are contained. It is a further object of this invention to provide an apparatus and method for settling micron and submicron particles from a liquid in which the particles are contained. It is a still futher object of this invention to provide an apparatus and method for removing catalyst fines from carbon black feedstock hydrocarbons.

Other aspects, objects and the various advantages of this invention will become apparent upon reading this specification, the drawing, and the appended claims.

STATEMENT OF THE INVENTION

In accordance with this invention there is provided an apparatus for removing fines particles from a liquid in which the particles are contained. The apparatus is a settling vessel having vertical dimensions sufficient in relation to the overall capactiy of the vessel to allow a temperature gradient between the upper portion and lower portion of liquid contained within the vessel with the vessel sufficiently insulated to minimize changes of temperature inside the vessel with respect to changes in ambient temperature outside the vessel. The settling vessel contains means for supplying indirect cooling heat exchange within the lower portion of the vessel and means for supplying indirect heating heat exchange within the upper portion of the vessel. There are also means for the inlet of solid-particles-containing liquid and means for removal of liquid both in the upper portion of the vessel and in the lower portion of the vessel.

In one embodiment of the invention a method for settling fines particles contained within a liquid is provided in which the liquid is transferred into a settling vessel having vertical dimensions sufficient in relation to the overall capacity of the vessel to allow a temperature gradient between the upper and lower portions of liquid contained therein and sufficiently insulated to minimize changes inside the vessel with respect to changes in ambient temperature outside the vessel; liquid within the vessel is subjected to indirect heat exchange to cool the liquid within the lower portion of the vessel and is subjected to indirect heat exchange to heat the liquid within the upper portion of the vessel thereby inducing a constant temperature gradient so that there are no convection currents within the liquid to retard the settling of solids particles within the liquid.

For the purposes of this invention fines particles are defined as solids of micron and submicron size. It is to be understood that the term micron size includes fines particles of up to about 20 microns. In the processing of carbon black feedstock, fines particles of about 2 to about 10 micron size are the ones most necessary to remove.

The drawing is a simplified schematic representation of an apparatus according to this invention.

The apparatus and method of this invention can best be understood in being described in conjunction with the drawing. Referring to the drawing, the apparatus is an enclosed vessel 1 enclosed with an insulating cover 2 sufficient to prevent changes of temperature inside the vessel in response to changes in the ambient temperature outside the vessel. The vessel is equipped with an inlet means 3 through which liquid containing contaminant fines is admitted. The liquid inlet line is preferably located near the bottom of the vessel 1. An outlet means 4 for withdrawing liquid from which contaminant fines have settled is provided near the top of the vessel along the side of the vessel in a position that would be near the top of the liquid level usually carried in the vessel. The vessel is also provided with means for removing collected fines 5 near the bottom of the vessel or in a well at the bottom of the vessel.

The most important aspect of the apparatus is the provision for cooling the lower portion of liquid contained in the vessel with an indirect means for cooling 6 which can consist of a cooling coil or other heat exchange means. Of equal importance is a provision of a means for indirectly providing heat exchange to supply heat to the upper portion of the liquid contained within the vessel. This indirect heating means 7 can also be comprised of an indirect heat exchange coil or other heat exchange means. It is important that the cooling heat exchanger be removed from the heating heat exchanger a sufficient distance that the operation of one does not interfere with the operation of the other to induce convection currents within the liquid contained in the vessel.

In the operation of the method of removing fines materials from the liquid in which they are contained by the method of this invention the liquid containing fines is fed into containing vessel 1 through inlet line 3. The incoming liquid is cooled by contact with heat exchange means 6 through which a cooling liquid is being circulated or by contact with liquid that has already been cooled by the indirect heat exchange. The object of the cooling of the inlet material is to prevent inducing convection currents of warm inlet material moving toward the upper regions of the vessel and carrying fines particles toward the upper regions of the vessel. The probability of eliminating all convection currents is remote, but by the process of this invention the reduction of the convection currents usually found in vessels greatly aids in the settling of fines materials through the stratified layers of liquid within the vessel.

Liquid reaching the upper regions of the vessel 1 is contacted with an indirect heating heat exchange means 7. The heating of the material in the upper part of the vessel further eliminates the possibility of convection currents within the vessel and also aids in more rapid passage of the fines through the heated liquid by gravitational settling so that there is a better separation of the solid material from the liquid in the upper, heated regions of the vessel so that production of a clarified liquid can be more rapidly attained. The residence time within the vessel is dependent upon the relative particle size and weight and the viscosity of the liquid within the vessel which is easily determinable for various combinations of solids material carried in a liquid. The clarified liquid can be removed through a liquid outlet line 4 in the upper section of the vessel near the surface of the liquid level within the vessel.

In the operation of the process fines material will collect near the bottom of the vessel so that means 5 are required for removing liquid containing large amounts of fines from the bottom of the vessel.

As a safety measure the vessel is provided with a vent means 8 in the top of the vessel so that gas can be vented from or admitted to the vessel as the liquid level in the vessel is changed. In the operation of the invention the vessel can be run either liquid full or with an air space above the liquid level within the vessel.

According to the process of this invention any liquid containing particulate matter that will settle in the liquid is suitable for treatment. The invention is particularly suitable for use in removing fines solids particles from relatively viscous liquid, i.e., the removing of catalyst residue from hydrocarbon oils.

The dimension of the treating vessel can vary considerably. The vessel must, however, have a sufficient vertical dimension in relation to its overall capacity to prevent interference between the heating of the upper levels of the liquid within the vessel and the cooling of the lower levels of liquid within the vessel and to minimize the effect of the inlet flow in agitating the liquid within the vessel. In this regard suitable baffling and regulation of the inlet and outlet flows of material can be provided to further minimize circulation of the liquid within the vessel. It is to be understood that inlet line 3, outlet line 4, and fines drain line 5 may each comprise several parallel conduits to minimize flow velocity into or out of tank.

The heating and cooling fluids used in the indirect heat exchange means will vary with the liquid being treated within the vessel. The degree of cooling will not be sufficient to so increase the viscosity of the treated liquid as to make more difficult the settling of the solids particles through the liquid. The heating of the liquid will be kept below the boiling range of the liquid being treated. In general, steam is considered the most practical fluid for heating, and cooling water of controlled temperature range is considered the most practical cooling fluid.

EXAMPLE

Carbon black reactor feedstock oil container about 550 to 650 parts per million (ppm) of micron to submicron size solids such as catalyst fines is pumped into bottom inlet connection on settling vessel or tank. Said settling vessel is about 40 feet in diameter by about 15 feet in shell height and has a capactiy of about 3360 barrels of 42 gallons each. Vessel is a cone roof tank and is insulated to minimize heat flow to and from the atmosphere.

Cooling means or coil located near bottom of vessel has water circulated therethrough at a temperature ranging from ambient to about 100° F. to maintain incoming oil at a moderate temperature. Heating means or coil located near top of vessel has steam supplied thereto to maintain a liquid temperature of about 300° F. in the upper portion of the oil. Consequently, feedstock oil in the vessel is coolest at the bottom and hottest at the top, with a gradual temperature change therebetween.

The hotter oil near the surface is less viscous and allows more rapid settling of the small particles of catalyst fines. Clarified feedstock containing about 100 ppm or less of catalyst fines is produced at a rate of about 1000 barrels per day and is drawn off at the extreme upper portion of vessel.

Accumulated catalyst fines are drawn off near bottom of vessel at a point opposite feedstock inlet.

Reasonable variation and modification are permissible within the scope of the disclosed invention the essence of which is that apparatus and method is provided for passage of a liquid containing solids fines particles into a vessel with cooling of the liquid in the lower portions of the vessel and heating of the liquid in the upper portions of the vessel to provide optimum conditions for settling of the solids from the liquid so that a clarified liquid containing a minimum of solids fines can be withdrawn from the upper portion of the vessel.

I claim:

1. A method for settling solids particles of micron and submicron size from a liquid in which the particles are contained, said method comprising:
   a. admitting said liquid containing solids particles through an inlet into the lower portions of a settling vessel having vertical dimensions sufficient in reltion to the overall capacity of the vessel to allow a temperature gradient between the upper and lower portions of the liquid contained therein and sufficiently insulated to minimize changes of temperature inside the vessel in response to changes in ambient temperature outside the vessel;
   b. cooling the liquid by indirect contact with a cooling fluid in the lower portion of said vessel;
   c. allowing said liquid to pass upward into contact with means in the upper portion of said vessel for heating said liquid;
   d. heating said liquid by indirect contact with a heating fluid;
   e. retaining said liquid within the vessel for a time sufficient to allow settling of said solids particles at least from the liquid contained in the upper portions of said vessel;
   f. removing clarified liquid through an outlet from the upper portions of said vessel; and
   g. removing said settled solids particles from the lower portion of said vessel.

2. A method of claim 1 wherein said liquid is a hydrocarbon oil.

3. A method of claim 2 wherein said hydrocarbon oil contains catalyst fines upon inlet to said vessel.

4. A method of claim 3 wherein water is used for indirect cooling and steam is used for indirect heating of said liquid within said vessel.

* * * * *